United States Patent

Bewick et al.

[11] Patent Number: 6,078,995
[45] Date of Patent: *Jun. 20, 2000

[54] METHODS AND APPARATUS FOR TRUE LEAST RECENTLY USED (LRU) BIT ENCODING FOR MULTI-WAY ASSOCIATIVE CACHES

[75] Inventors: Gary Bewick, Palo Alto; John M. Golenbieski, Sunnyvale, both of Calif.

[73] Assignee: Micro Magic, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/774,965

[22] Filed: Dec. 26, 1996

[51] Int. Cl.[7] .............................. G06F 12/00; G06F 13/00
[52] U.S. Cl. ........................ 711/136; 711/118; 711/128; 711/159; 711/160
[58] Field of Search .............................. 711/3, 118, 128, 711/136, 154, 159, 160, 133

[56] References Cited

U.S. PATENT DOCUMENTS

| | | | |
|---|---|---|---|
| 4,008,460 | 2/1977 | Bryant et al. | 711/136 |
| 4,059,850 | 11/1977 | Van Eck | 711/136 |
| 4,334,289 | 6/1982 | Lange et al. | 711/160 |
| 4,511,994 | 4/1985 | Webb et al. | 711/160 |
| 5,210,843 | 5/1993 | Ayers | 711/128 |
| 5,224,217 | 6/1993 | Zangenehpour | 711/136 |
| 5,325,504 | 6/1994 | Tipley et al. | 395/425 |
| 5,325,511 | 6/1994 | Collins et al. | 711/128 |
| 5,353,425 | 10/1994 | Malamy et al. | 711/136 |
| 5,450,565 | 9/1995 | Nadir et al. | 711/128 |
| 5,530,833 | 6/1996 | Iyengar et al. | 711/128 |
| 5,548,742 | 8/1996 | Wang et al. | 711/128 |
| 5,564,034 | 10/1996 | Miyake | 711/128 |
| 5,611,072 | 3/1997 | Tran | 711/136 |
| 5,651,135 | 7/1997 | Hatakeyama | 711/128 |

*Primary Examiner*—Tuan V. Thai
*Attorney, Agent, or Firm*—Limbach & Limbach L.L.P.

[57] ABSTRACT

Two techniques are provided for implementing a least recently used (LRU) replacement algorithm for multi-way associative caches. A first method uses a special encoding of the LRU list to allow write only update of the list. The LRU list need only be read when a miss occurs and a replacement is needed. In a second method, the LRU list is integrated into the tags for each "way" of the multi-way associative cache. Updating of the list is done by writing only the "way" of the cache that hits.

5 Claims, 3 Drawing Sheets

METHODS AND APPARATUS FOR TRUE LEAST RECENTLY USED (LRU) BIT ENCODING FOR MULTI-WAY ASSOCIATIVE CACHES

BACKGROUND OF THE INVENTION

1. Field of the Invention

The present invention relates to microprocessor architectures and, in particular, to a least recently used (LRU) updating scheme for microprocessor cache memory.

2. Discussion of the Related Art

Digital processors frequently include a small, fast local memory that is used to hold data or instructions likely to be needed in the near future. This local memory is known as a cache. When instructions or data are retrieved from main memory to be used by the processor, they are also stored in the cache, since there is a high probability that they will be needed again in the near future.

The cache is usually constructed from a random access, read/write memory block (RAM). This RAM can access a single stored object (known as a line) in a single processor cycle. The cache size is chosen to match the processor cycle time and usually can be read or written, but not both, during a cycle.

Each line in the cache consists of two pieces: the data being saved and the address of the data in main memory (the tag). FIG. 1 shows a block diagram of a simple cache 10. When the processor makes a reference to main memory, a portion of the reference address, called the index, is used to access a single line stored in the cache RAM 12. If the tag of the accessed line in the cache 10 matches the address of the referenced data, then a "hit" has occurred and the cache RAM 12 supplies the line to the processor immediately. If the tag does not match the reference address, then a "miss" has occurred and the address is supplied to main memory to retrieve the requested line. Main memory is usually much slower than the processor, so a delay occurs while the line is being fetched. When main memory delivers the line to the processor, it is written into the cache RAM 12 using the same index as the original look-up, along with it's tag. The line is also supplied to the processor so that computation can continue. Commonly, the index is merely the low order bits of the main memory address, although other mappings can be used.

The caching scheme shown in FIG. 1 is known as a direct mapped cache. That is, for a given main memory address, the line at that memory address can be placed into exactly one place in the cache. This type of cache is the simplest and fastest type of cache. When a miss occurs, a replacement line can go into only one location in the cache and bumps out whatever happens to be in that cache location.

Direct mapped caches can have pathological miss behavior. For example, assume the existence of a 256 line, direct mapped cache. The index into the cache will be the low order 8 bits of the main memory address. If two different main memory addresses happen to be the same in the low order 8 bits, then they will produce the same cache index and compete for the same line in the cache. Even though the rest of the cache may be completely unused, accesses in succession to those memory locations will constantly miss. Each access bumps out the data for the subsequent access.

To reduce the probability of pathological behavior, and to increase the overall hit rate, caches are frequently constructed with associativity. The degree of associativity measures the number of different places in the cache that a given line from main memory can be placed. Common associativities are 2-way, 4-way, or 8-way, which means that a given line from main memory can be placed in 2, 4, or 8 different places in the cache, respectively. Having more than one location where lines can be placed in the cache reduces the probability of pathological miss behavior and improves the hit rate of the cache.

If a line is to be brought into an N-way associative cache, there will be N different locations in the cache where it can be placed. A choice must be made by the cache controller as to which one of the N different locations is to receive the replacement line. The first choice would be to use an invalid or empty cache location; but eventually all locations get filled and a valid line in the cache must be replaced. A common algorithm used to determine which line to replace is referred to as least recently used (LRU). Using the LRU algorithm, each of the N locations in the cache in which a particular line can be placed has it's usage tracked. When a new line must replace an existing line, the particular line the last use of which was farthest back in time is chosen to be replaced.

To determine which of the N lines is to be replaced, an ordered list is maintained. When a cache line gets used (i.e. a hit occurs), it is moved to the head of the list. The cache line at the end of the list will always be the least recently used line and the choice for replacement if that becomes necessary.

For example, assume the existence of a 5-way associative cache. A given line in main memory can then be placed into five different locations in the cache, the places being numbered from 0 to 4. The initial LRU list is arbitrarily initialized to be:

0- 1- 2- 3- 4

If a cache access and hit occurs for cache line 2, then it gets moved to the head of the list:

2- 0- 1- 3- 4

If a cache miss occurs, then the new line from main memory will be placed into cache line 4, replacing whatever was previously in line 4, and the LRU list gets updated:

4- 2- 0- 1- 3

Each time a cache line gets used (hit or miss) it moves to the beginning of the list. Each time a cache line is replaced, the line at the end of the list is chosen for the replacement.

A possible implementation of the LRU list encodes the list into a binary number. In general, there are N! possible LRU lists for each group of lines in an N way associative cache, where $N!=N\times(N-1)\times(N-2)\times \ldots \times2\times1$. This means a minimum of $]\log_2(N!)[$ bits are needed for each list, where $]x[$=the smallest integer$\geq x$. Table I shows the minimum number of bits needed to encode the LRU list for various associativities.

TABLE I

| Associativity | LRU Bits |
| --- | --- |
| 2 | 1 |
| 3 | 3 |
| 4 | 5 |
| 5 | 7 |
| 6 | 10 |
| 7 | 13 |
| 8 | 16 |

FIG. 2 shows a sample 3-way associative cache 20 built out of three banks of direct mapped caches 22. The LRU RAM block 24 in FIG. 2 is a RAM that contains the same number of entries as any one of the direct mapped caches, but is only three bits wide (from Table I). All of the indexes into the three direct mapped caches 22 and the LRU RAM 24 are the same. The hit signals from all of the direct mapped caches 22 are combined by select logic 26 into a single hit signal, and are also used to control a multiplexer 28. The multiplexer 28 selects the correct line to be delivered as the cache output from whichever bank 22 that happened to hit.

The fundamental problem with encoding the LRU list in the minimum number of bits is that the LRU RAM 24 usually must be cycled twice for each cache access. The LRU bits must be read and then written (if a change is needed), because the value to be written back into the LRU RAM 24 is a function of both the "way" that hits and the LRU list that was read. The data areas of the cache require a single cycle, so if a sequence of consecutive cache accesses is to be supported, then the LRU RAM 24 must either cycle twice as fast as the cache RAMs 22 (which is possible, but difficult), or it must support a read and a write operation to different locations simultaneously (dual port). A dual port memory is generally twice as big and slower than a single port memory and has a completely different internal array structure than a single port memory. In addition, care must be taken when simultaneously reading and writing to avoid coupling noise into the read port.

U.S. Pat. No. 5,325,504, issued Jun. 28, 1994, to R. E. Tipley et al. for "Method and Apparatus for Incorporating Cache Line Replacement and Cache Write Policy Information into Tag Directories in a Cache System" discloses techniques for implementing an LRU scheme for a 2-way associative cache. Each "way" of the cache contains a "partial LRU" bit which is updated when the "way" is used such that the LRU "way" can be determined by the exclusive-OR of the LRU bits from each of the two "ways." The '504 patent also discloses how to do "pseudo LRU" with associativity greater than two by dividing the "ways" into two groups, doing LRU between the two groups and then within a single group.

SUMMARY OF THE INVENTION

In accordance with the general concept of the present invention, the LRU bit encoding for an N-way associative cache divides the LRU bits into N−1 fields of unequal size, where field M contains N−M−1 bits. Each bit in field M represents a LRU relationship between "way" M and "way" K, where K>M. If the bit in field M corresponding to "way" K is a zero, then "way" M has been used more recently than "way" K. If the bit is a one, then "way" K has been used more recently than "way" M.

This general encoding concept is utilized to provide two methods of implementing a least recently used (LRU) replacement algorithm for multi-way associative caches. The first method uses a special encoding of the LRU list to allow write only update of the list. The LRU list need only be read when a miss occurs and a replacement is needed. In the second method, the LRU list is integrated into the tags for each "way" of the multi-way associative cache. Updating of the list is done by writing only the "way" of the cache that hits.

The encoding concepts of the present invention allow the LRU list to be maintained in a single port RAM which is nearly identical to that of the cache RAMs, eliminating the need for a completely different structure to hold the LRU bits. As stated above, the special encoding of bits makes it possible to eliminate the LRU RAM read portion of the LRU list checking. That is, the LRU list to be written into the LRU RAM is a function only of the hit or miss signals from the various "ways" of the cache. The dependence on the old LRU list value is eliminated.

A better understanding of the features and advantages of the present invention will be obtained by reference to the following detailed description and accompanying drawings which set forth an illustrative embodiment in which the principles of the invention are utilized.

DESCRIPTION OF THE INVENTION

Figure 1:
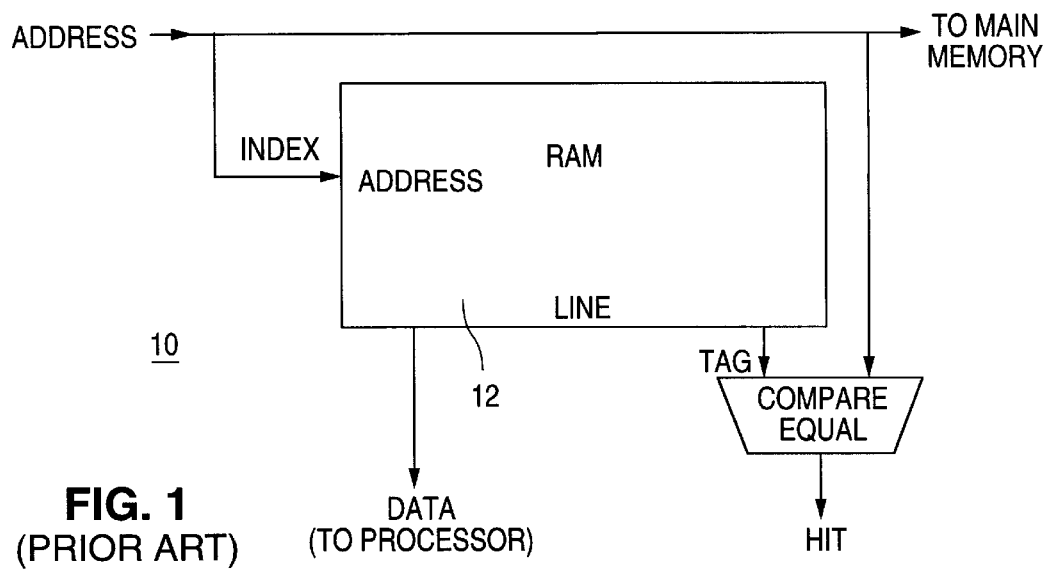
FIG. 1 is a block diagram illustrating a conventional, simple cache memory.
Figure 2:
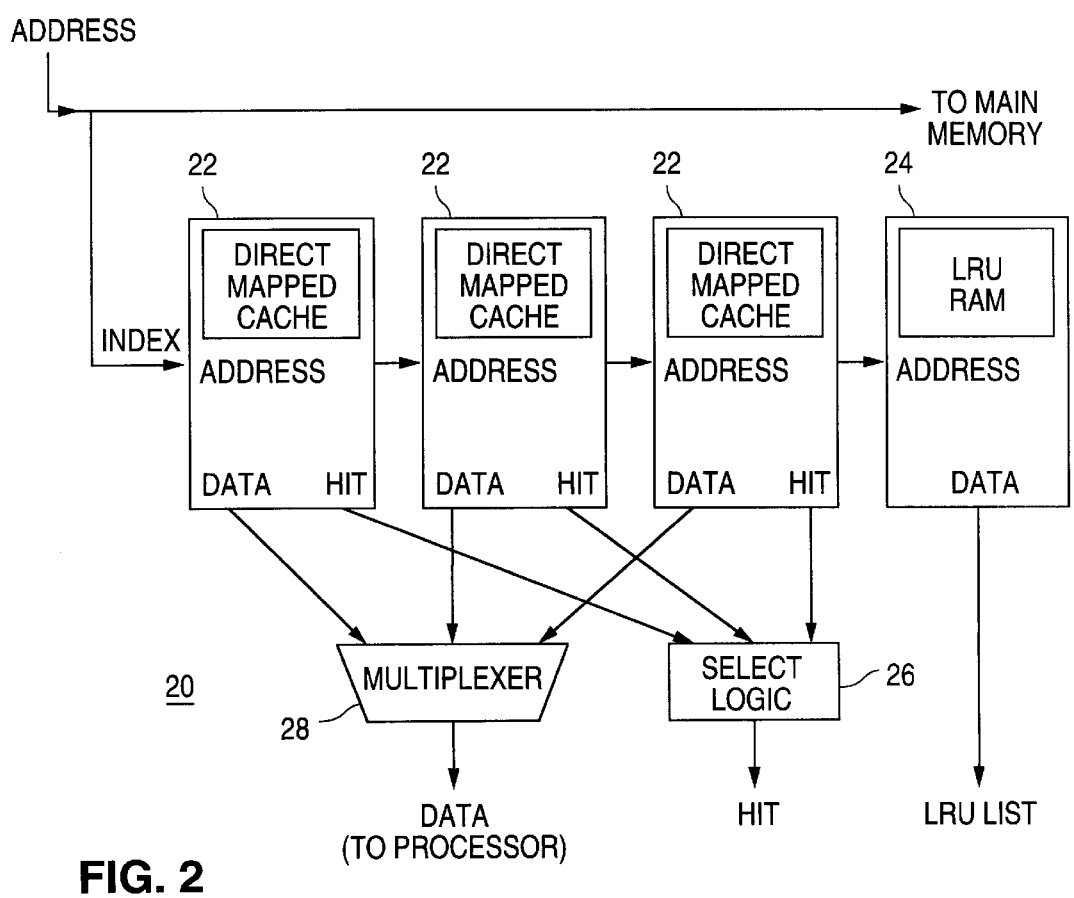
FIG. 2 is a block diagram illustrating a conventional 3-way associative cache.
Figures 3, 4:
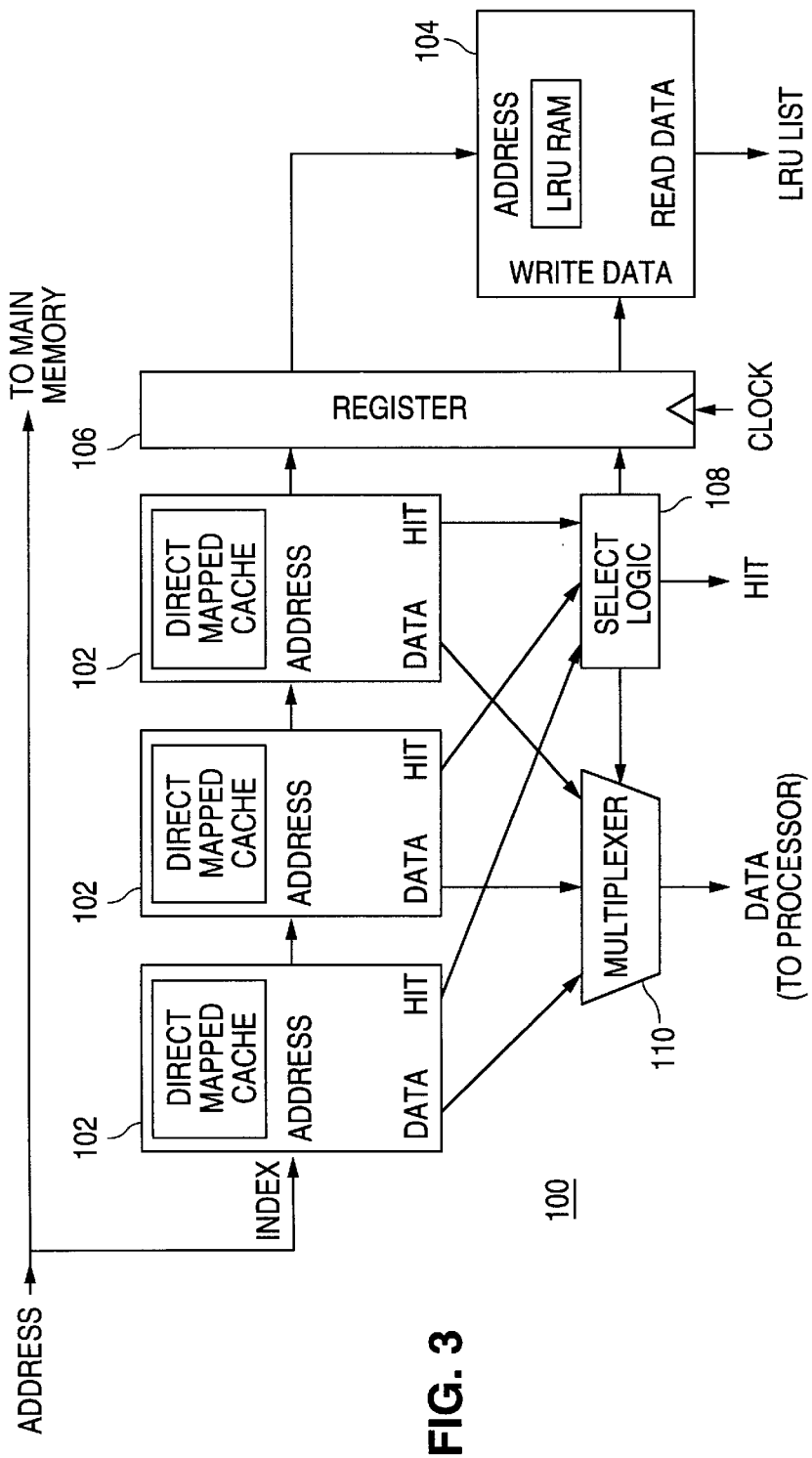
FIG. 3 is a block diagram illustrating an embodiment of a 3-way associative cache with write-only LRU in accordance with the concepts of the present invention.
FIG. 4 illustrates a LRU encoded list format for a 5-way associative cache in accordance with the concepts of the present invention.

FIG. 3 shows a modified version 100 of the FIG. 2 3-way associate cache, with write-only LRU bits, that includes three banks of direct mapped caches 102 and an LRU RAM 104. The updates of the LRU bits are delayed by one cycle by a register 106. The first cycle reads the cache and figures out which bank hits. The second cycle updates the LRU bits by writing the LRU RAM 104. This method supports a cache rate of one cycle per access. As in the case of the FIG. 2 cache, the hit signals from all of the direct mapped caches 102 are combined by select logic 108 into a single hit signal, and are allowed to control a multiplexer 110. The multiplexer 110 selects the correct line to be delivered as the cache output from whichever cache bank 102 that hit.

Encoding

In accordance with the invention, the LRU bit encoding for an N-way associative cache divides the LRU bits into N−1 fields of unequal size. Field M contains N−M−1 bits. Each bit in the field represents a more recently used relationship between "way" M and "way" K, where K>M. If the bit in field M corresponding to "way" K is a zero, then "way" M has been used more recently than "way" K. If the bit is a one, then "way" K has been used more recently than "way" M.

FIG. 4 illustrates the encoded LRU list for a 5-way associative cache. The encoded format is divided into distinct fields of length 4,3,2, and 1 bits, respectively. The fields correspond to the "way" of the same number; that is, Field 0 corresponds to "way" 0, Field 1 corresponds to "way" 1, and so on. Within each field, the bits are numbered according to the "way" K for which the bit represents a relationship. For example, the bit under the arrow is the bit that indicates the relationship between "way" 0 and "way" 3. This bit being a zero indicates that "way" 0 has been used more recently than "way" 3. The meanings of the other bits in the encoded LRU list are obtained in an analogous manner.

With this encoding, the total number of bits in the LRU list is (N−1)+(N−2)+ . . . +2+1=N×(N−1)/2. Table II shows the number of bits needed for the encoded LRU list for various amounts of associativity. Table II also includes the contents of Table I for comparison purposes. The overhead amounts in Table I are based upon a 16 byte (128 bit) line.

TABLE II

| | LRU Minimum | | LRU Write Only | |
|---|---|---|---|---|
| Associativity | Bits | Overhead | Bits | Overhead |
| 2 | 1 | 0.78% | 1 | 0.78% |
| 3 | 3 | 2.34% | 3 | 2.34% |
| 4 | 5 | 3.90% | 6 | 4.69% |
| 5 | 7 | 5.47% | 10 | 7.81% |
| 6 | 10 | 7.81% | 15 | 11.72% |
| 7 | 13 | 10.16% | 21 | 16.41% |
| 8 | 16 | 12.50% | 28 | 21.88% |

Updating

Updating of the encoded LRU list requires the ability to write specific subfields in the format, leaving all other bits unchanged. This function is usually easy to obtain with almost no modification to conventional SRAM designs. The algorithm for updating the encoded LRU list, when "way" M is used consists of two steps: field M is written with zeros; then, all fields <M are written with a 1 in the bit position corresponding to a relationship with "way" M. All other bits in the encoded LRU list are left unchanged.

Table III provides an example for a 5-way associative cache, given the reference pattern 2-4-1-3-0-4. That is, after initialization, a reference is made to "way" 2, followed by a reference to "way" 4, and so on. Each line in Table III represents a single reference to the cache and specifies the initial LRU bits and the final LRU bits. The format of the bits is the same as that shown in FIG. 4. Bits marked as "u" are left unchanged by the reference.

TABLE III

| Initial LRU | "Way" Accessed | Write | Final LRU |
|---|---|---|---|
| 0000 000 00 0 | 2 | u1uu 1uu 00 u | 0100 100 00 0 |
| 0100 100 00 0 | 4 | uuu1 uu1 u1 1 | 0101 101 01 1 |
| 0101 101 01 1 | 1 | 1uuu 000 uu u | 1101 000 01 1 |
| 1101 000 01 1 | 3 | uu1u u1u 1u 0 | 1111 010 11 0 |
| 1111 010 11 0 | 0 | 0000 uuu uu u | 0000 010 11 0 |
| 0000 010 11 0 | 4 | uuu1 uu1 u1 1 | 0001 011 11 1 |

Determining the LRU "Way"

The least recently used "way" is determined by comparing the LRU bits to the complement of the possible write values for each particular "way." Bits marked as "u" in the write values become "don't cares" (d) in the values to be compared. The single comparison that matches indicates which "way" is the least recently used. Table IV shows the comparison values for the 5-way associative cache example of Table III. Applying the match values from Table IV to the final line of Table III yields a match only for the pattern d0dd 0dd 11 d, which specifies that the least recently used "way" was 2.

TABLE IV

| "LRU Way" | Match Value |
|---|---|
| 0 | 1111 ddd dd d |
| 1 | 0ddd 111 dd d |
| 2 | d0dd 0dd 11 d |
| 3 | dd0d d0d 0d 1 |
| 4 | ddd0 dd0 d0 0 |

Integrated LRU bits

At times, it may not be desirable to create a separate structure just to hold the LRU bits. In this case, the LRU bits can be integrated into the cache storage array. If an N-way associative cache is implemented as N separate banks of direct mapped caches, as shown in FIG. 2, then an access to the cache will take two cycles. First, all the banks are cycled to access the data and tags to determine whether the desired data is somewhere in the cache. If the data is in one of the banks, then the LRU bits must be updated and, for stores, results written into the data area of the selected bank. The LRU bits can be maintained as a block in one of the banks, but if data is written into a different bank, then both banks must execute a write operation during the same cycle. This causes extra power consumption. Also, it is desirable for each bank to be as identical as possible to reduce the design time. If this requirement is needed, then extra, unused bits must be added to the other non-LRU bit maintaining banks, making the overall cache slightly larger.

It is possible to distribute the LRU bits throughout all of the banks yet cycle only the bank that actually hits to update the LRU bits. This is done in the following manner. For each line in each bank, a set of bits is appended that indicates the usage relationship with respect to all the other banks. For example, for a 4-way associative memory, three extra bits dedicated for LRU maintenance are appended to each line in each bank. When all the banks are cycled to look for an object, the LRU bits from all direct mapped caches are also read and distributed to every bank. When the bank that contains the requested data is identified, only that bank is cycled to update it's LRU bits. If data is being stored into the bank, it can be written at the same time as the LRU bits.

Integrated LRU Bit Encoding

For an N-way associative memory, each line of each bank contains N−1 extra LRU bits. Each of the N−1 bits specifies a use relationship (more recently or less recently) with respect to one other bank in the cache. This produces redundancy that allows the LRU bits to be updated in all banks by merely writing into the single bank that gets used. There is redundancy because bank M has an LRU bit that specifies a use relationship with respect to bank N (a $M_N$ bit); bank N also has an LRU bit that specifies a use relationship with respect to bank M (a $N_M$ bit) The true relationship is determined by taking the exclusive-OR ($\oplus$) of the $M_N$ bit with the $N_M$ bit. That is, for N<M:

If $M_N \oplus N_M = 0$ Then N has been used more recently than M

If $M_N \oplus N_M = 1$ Then M has been used more recently than N

Determining the LRU "Way"

Figure 5:
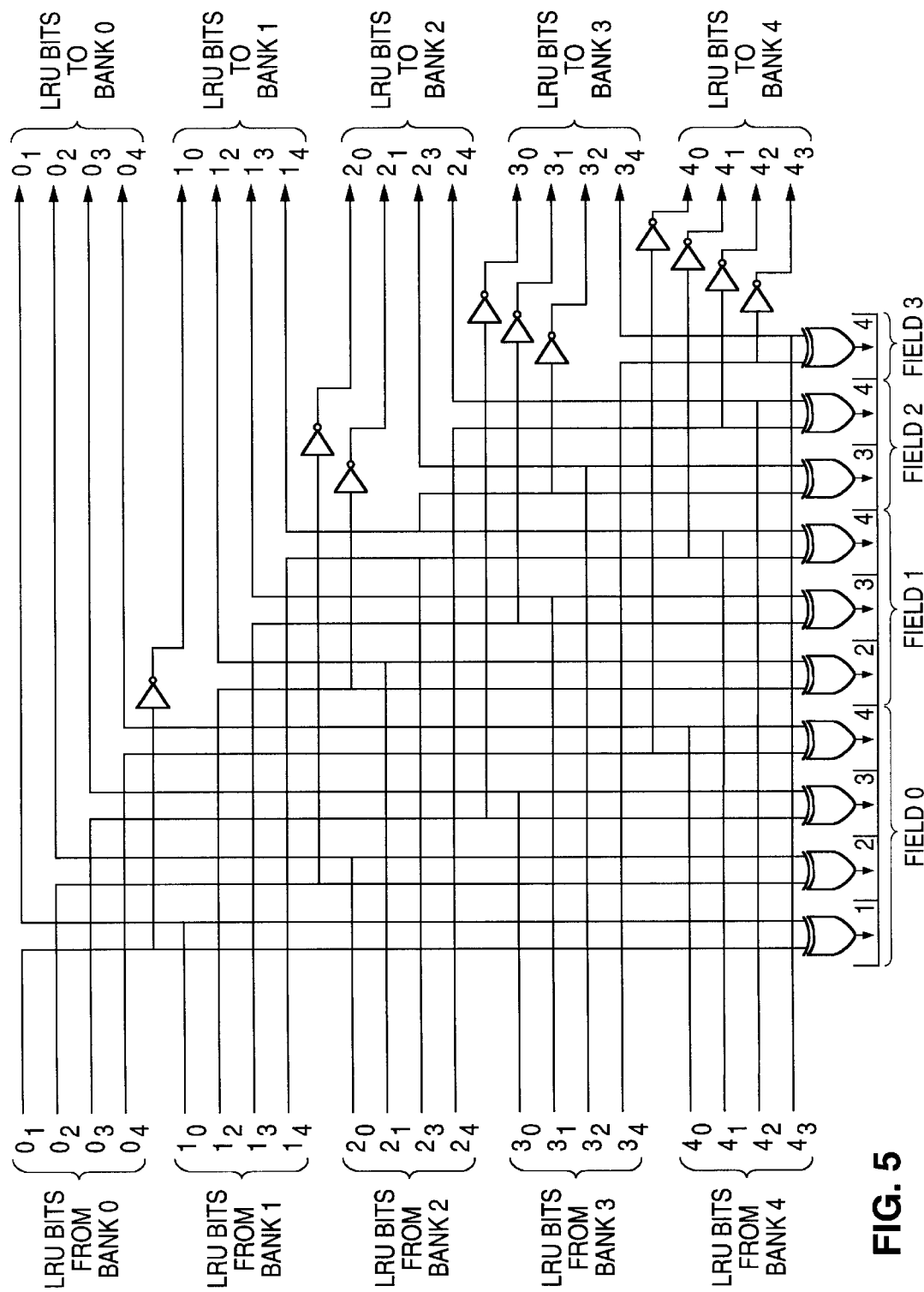
FIG. 5 is a logic diagraming illustrating production of a LRU encoded list for a 5-way associative cache in accordance with the concepts of the present invention.

FIG. 5 shows how the LRU bits stored at each bank of a 5-way associative cache are combined to produce the fields pictured in FIG. 4. Each of the five banks sends four bits of information to the central decoder, shown in FIG. 5 as entering from the left. The decoder consists of a collection of exclusive-OR gates which transform the inputs into exactly the same form as that shown in FIG. 4. Determination of the LRU bank can then use the exact same procedure as described above.

Updating

When a particular bank, say bank N, gets used, only the LRU bits for that bank are updated. The value for each bit written into the LRU bits of bank N are as follows:

$N_M \oplus M_N$ If N<M $N_M \oplus \overline{M_N}$ If N>M

FIG. 5 shows the connections for the LRU bits to be distributed to all of the banks, assuming that only one bank is written per cycle. The outputs to be distributed to the banks are shown on the right.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A method of LRU bit encoding for an N-way associative cache that includes N banks, where N is greater than 2, and wherein the LRU bit encoding includes, for each line in each bank of the cache, an associated set of LRU bits that indicates a usage relationship of said line with respect to all other banks, the method comprising dividing the LRU bits into N−1 fields of unequal size, where field M contains N−M−1 bits, and wherein each bit in field M represents a LRU relationship between "way" M and "way" K, where K>M, such that if the bit in field M corresponding to "way" K is a zero, then "way" M has been used more recently than "way" K, and if said bit is a one, then "way" K has been used more recently than "way" M.

2. A write-only method of updating an LRU bit encoding for an N-way associative cache that includes N banks, where N is greater than 2, and wherein the LRU bit encoding includes, for each line in each bank of the cache, an associated set of LRU bits that indicates a usage relationship of said line with respect to all other banks, the method comprising:

dividing the LRU bits into N−1 fields of unequal size, where field M contains N−M−1 bits, and wherein each bit in field M represents a LRU relationship between "way" M and "way" K, where K>M, such that if the bit-in field M corresponding to "way" K is a zero, then "way" M has been used more recently than "way" K, and if said bit is a one, then "way" K has been used more recently than "way" M; and when "way" M is used, writing field M with zeros and writing all fields >M with a one in the bit position corresponding to a relationship with "way" M, leaving all other bits unchanged.

3. A method as in claim 2, and further comprising:

determining the least recently used "way" by comparing the correct LRU bit encoding to the to the complement of possible write values for each "way."

4. A method of uniformly distributing LRU bits in an N-way associative cache, where N is greater than 2, among N banks of the cache, the method comprising:

for each line in each bank of the cache, appending a set of LRU bits that indicates a usage relationship of said line with respect to all other banks;

during a read access for a referenced line, reading and distributing to each bank the LRU bits from all banks;

identifying the bank that contains the referenced line; and updating the LRU bits only in the bank that contains the referenced line;

transforming the uniformly distributed LRU bits into N−1 fields of unequal size, where field M contains N−M−1 bits, and wherein each bit in field M represents an LRU relationship between "way" M and "way" K, where K is greater than M, such that if the bit in field M corresponding to "away" K is zero, then "way" M has been more recently used than "way" K, and if said bit is 1, then "way" K has been more recently used than "way" M.

5. A method as in claim 4 and wherein data is written into the bank that contains the referenced line at the same time that the LRU bits for said line are updated.

* * * * *